United States Patent [19]

Liska

[11] Patent Number: 4,883,727

[45] Date of Patent: Nov. 28, 1989

[54] VENTED NICKEL-CADMIUM STORAGE CELL

[75] Inventor: Jean-Louis Liska, Bordeaux, France

[73] Assignee: Saft, S.A., Romainville, France

[21] Appl. No.: 321,274

[22] Filed: Mar. 9, 1989

[30] Foreign Application Priority Data

Mar. 15, 1988 [FR] France ................................ 88 03333

[51] Int. Cl.$^4$ ............................................. H01M 2/14
[52] U.S. Cl. ..................................... 429/145; 429/206
[58] Field of Search ............... 429/206, 142, 144, 145, 429/247, 222, 223

[56] References Cited

U.S. PATENT DOCUMENTS

| | | | |
|---|---|---|---|
| 3,980,497 | 9/1976 | Gillman et al. ...................... | 429/145 |
| 4,287,275 | 9/1981 | Davis ................................... | 429/206 |
| 4,288,503 | 9/1981 | Goldberg ............................ | 429/145 |

FOREIGN PATENT DOCUMENTS

| | | | |
|---|---|---|---|
| 1054231 | 5/1976 | Japan .................................. | 429/145 |
| 0028393 | 7/1980 | Japan .................................. | 429/145 |
| 60-3855 | 1/1986 | Japan . | |
| 61-13588 | 1/1986 | Japan . | |

OTHER PUBLICATIONS

French Search Report FR8803333.

*Primary Examiner*—Anthony Skapars
*Attorney, Agent, or Firm*—Kenyon & Kenyon

[57] ABSTRACT

A vented nickel-cadmium storage cell with reduced water consumption has its inter-electrode gap occupied by a separator comprising at least one polymer fiber felt and a perforated polyolefin film.

5 Claims, No Drawings

VENTED NICKEL-CADMIUM STORAGE CELL

The present invention relates to a vented alkaline storage cell implementing the nickel-cadmium couple.

BACKGROUND OF THE INVENTION

When such a storage cell is over-charged, water consumption is observed.

The object of the present invention is to implement means for considerably reducing this water consumption, but without thereby impairing the discharge peformance of the cell.

SUMMARY OF THE INVENTION

The present invention provides a vented alkaline storage cell implementing the nickel-cadmium couple, the cell comprising a housing containing a set of nickel positive electrodes and cadmium negative electrodes with interposed separators and an alkaline electrolyte, wherein the width of the gap between adjacent electrodes lies in the range 0.1 mm to 1 mm and is occupied by a separator comprising at least one polymer fiber felt associated with a membrane constituted by a perforated polyolefin film, with the thickness of said film lying in the range 10 $\mu$m to 50 $\mu$m, with the area of each peforation lying in the range 0.1 mm$^2$ to 20 mm$^2$, and with the void ratio lying in the range 5% to 50%.

Said polyolefin film may either be microporous, or else it may be acrylic acid grafted.

There are several ways in which the positive electrodes may be made; they may be in the form of:

sintered nickel impregnated with nickel hydroxide, and optionally including hydroxides of cadmium and cobalt;

nickel sponge impregnated with nickel hydroxide, and optionally including hydroxides of cadmium and cobalt;

nickel fibers or nickel-plated fibers impregnated with nickel hydroxide, and optionally including hydroxides of cadmium and cobalt; or a support of nickel or nickel-plated steel covered in an active mass based on nickel hydroxide, and optionally including hydroxides of cadmium and cobalt.

Similarly, the negative electrodes may be made in the form of:

sintered nickel imprenated with cadmium hydroxide;

nickel sponge imprenated with cadmium hydroxide;

nickel fibers or nickel-plated fibers impregnated with cadmium hydroxide; or a support of nickel or nickel-plated steel covered in an active mass based on cadmium hydroxide and made pasty with an organic substance.

The fibers of said felt may be made of polyamide, polypropylene, or polyethylene.

The electrolyte used comprises a mixture of potassium hydroxide and water, and may have sodium and lithium hydroxide added thereto.

Other characteristics and advantages of the present invention appear from the following description of an embodiment given by way of non-limiting example.

In an alkaline storage cell having sintered nickel positive electrodes and negative electrodes having cadmium held by an organic substance, the width of the gap between pairs of electrodes is 0.25 mm. This space is filled with two felt sheets made of polyethylene or polypropylene, and a membrane of the invention is disposed between them. The membrane is constituted by a 25 micron ($\mu$m) thick polyolefin film with peforations that are 1 mm$^2$ in area and with a void ratio of 27%.

When such a storage cell is charged at a constant voltage of 1.42 volts at 25° C., the observed water consumption is 80% less than the water consumption observed in an identical storage cell without a membrane of the invention.

It is also observed that in other respects the performance of a storage cell of the invention is the same as that of an identical storage cell without a peforated membrane.

It should be observed that when recharging is complete, the cell voltage rises rapidly by a step in the range 0.1 volts to 0.5 volts, and it is therefore easy to detect the end of charging. As a result, a cell of the invention may be charged at constant voltage in the range 1.42 volts to 1.55 volts, and at temperatures of up to 60° C. without thermal runaway.

Naturally, the invention is not limited to the embodiment described above. In particular the reduction in water consumption may be anywhere between 30% and 90% depending on the geometry chosen for the membrane, the void ratio may lie in the range 5% to 50%, and the area of each peforation may lie in the range 0.01 mm$^2$ to 20 mm$^2$. Increasing the void ratio and the area of each perforation reduces water consumption but also reduces the maximum temperature at which constant voltage charging is possible without thermal runaway.

Any of the means described may be replaced by equivalent means without going beyond the scope of the invention.

I claim:

1. A vented alkaline storage cell implementing the nickel-cadmium couple, the cell comprising a housing containing a set of nickel positive electrodes and cadmium negative electrodes with interposed separators and an alkaline electrolyte, wherein the width of the gap between adjacent electrodes lies in the range 0.1 mm to 1 mm and is occupied by a separator comprising at least one polymer fiber felt associated with a membrane constituted by a perforated polyolefin film, with the thickness of said film lying in the range 10 $\mu$m to 50 $\mu$m, with the area of the individual peforations lying in the range 0.1 mm$^2$ to 20 mm$^2$, and with the void ratio lying in the range 5% to 50%.

2. An alkaline cell according to claim 1, wherein said polyolefin film is microporous.

3. An alkaline cell according to claim 1, wherein said polyolefin film is acrylic acid grafted.

4. An alkaline cell according to claim 1, wherein said membrane is disposed between two sheets of said felt.

5. An alkaline cell according to claim 1, wherein the fibers of said felt are made of a material chosen from polyethylene, polypropylene, and polyamide.

* * * * *